United States Patent [19]

Ivy

[11] Patent Number: 4,718,304
[45] Date of Patent: Jan. 12, 1988

[54] VEHICLE DIFFERENTIAL WHICH DISTRIBUTES TORQUE BETWEEN VEHICLE WHEELS IN ACCORDANCE WITH OPERATING DEMANDS

[76] Inventor: Jessie T. Ivy, 686 W. Shore Dr., Anacortes, Wash. 98221

[21] Appl. No.: 680,651

[22] Filed: Dec. 11, 1984

[51] Int. Cl.$^4$ ............................................. F16H 1/42
[52] U.S. Cl. ................................................... 74/714
[58] Field of Search .................... 74/714, 710, 710.5, 74/711, 372, 375

[56] References Cited

U.S. PATENT DOCUMENTS

| | | | |
|---|---|---|---|
| 1,225,842 | 5/1917 | Mennie | 74/711 |
| 1,372,381 | 3/1921 | Werts | 180/6.2 |
| 1,771,440 | 7/1930 | Jeffries | 180/75 |
| 1,918,864 | 7/1933 | Priest | 74/711 |
| 2,103,143 | 12/1937 | Brown | 74/711 |
| 2,366,912 | 1/1945 | Lauper | 74/375 |
| 2,536,392 | 1/1951 | Randall | 74/711 |
| 2,550,750 | 5/1951 | Abelt | 74/711 |
| 2,651,215 | 9/1953 | Schoenrock | 74/711 |
| 2,697,366 | 12/1954 | Carter | 74/711 |
| 2,786,366 | 3/1957 | Tallakson | 74/711 |
| 2,789,446 | 4/1957 | Schoenrock | 74/711 |
| 2,946,239 | 7/1960 | Hait | 74/710.5 |
| 2,949,792 | 9/1960 | Smith | 74/711 |
| 3,060,765 | 10/1962 | Rinsoz | 74/710.5 |
| 3,127,791 | 4/1964 | Roe | 74/714 |
| 3,494,226 | 2/1970 | Biddle | 74/711 |
| 4,245,524 | 1/1981 | Dammon | 74/714 |

FOREIGN PATENT DOCUMENTS 643850 5/1935 Fed. Rep. of Germany ........ 74/372

OTHER PUBLICATIONS

"Gleason's Impossible Differential", *Popular Science*, Feb. 1984.

*Primary Examiner*—Leslie Braun
*Assistant Examiner*—David Novais
*Attorney, Agent, or Firm*—Donald A. Kettlestrings

[57] ABSTRACT

A vehicle differential which distributes torque between vehicle wheels in accordance with operating demands can be installed in existing differential housings. The differential includes a case which defines a plurality of openings therein. Gear assembly devices are mounted on the exterior of the case with portions projecting into the interior of the case through predetermined ones of the openings, and the gear assembly devices are in meshing relation with axle driving mechanisms for controlling movement of the axle driving mechanisms.

16 Claims, 13 Drawing Figures

VEHICLE DIFFERENTIAL WHICH DISTRIBUTES TORQUE BETWEEN VEHICLE WHEELS IN ACCORDANCE WITH OPERATING DEMANDS

This invention relates to a differential for use in vehicles and more particularly to a vehicle differential which distributes torque in accordance with operating demands.

Many types of vehicle differentials have been developed over the years. Although such differentials have served the purpose, they have not proved entirely satisfactory under all conditions of service for the reason that considerable difficulty has been experienced in properly distributing torque between the vehicle wheels under various types of operating conditions.

It is, therefore, an object of the present invention to provide a unique vehicle differential.

Another object is to provide such a differential which can be installed in present day differential housings.

A further object of the invention is the provision of such a differential which automatically adjusts the torque applied to the vehicle wheels under all types of operating conditions.

Additional objects and advantages of the invention will be set forth in part in the description which follows and in part will be obvious from the description or may be learned by practice of the invention. The objects and advantages are realized and attained by means of the instrumentalities and combinations particularly pointed out in the appended claims.

To achieve these and other objects the present invention provides a differential comprising: a differential case defining a plurality of openings therein; a ring gear attached to the case; a driving pinion gear in meshing relation with the ring gear; left and right axle means disposed in end-to-end relationship with each other and at least partially positioned within the case for connecting with two wheels of the vehicle; axle driving means within the case and in operative relationship with the left and right axle means for selectively rotating the axle means; gear assembly means mounted on the exterior of the case, projecting into the interior of the case through predetermined ones of the openings, and in meshing relation with the axle driving means for controlling movement of the axle driving means; and a substantially oil-tight housing enclosing the previously recited elements.

It is to be understood that both the foregoing general description and the following detailed description are exemplary and explanatory but are not restrictive of the invention.

The accompanying drawings, which are incorporated in and constitute a part of the specification, illustrate examples of preferred embodiments of the invention and together with the description serve to explain the principles of the invention.

With reference now to the drawings, wherein like reference characters designate like or corresponding parts throughout the several views, there is shown in FIGS. 1–7 a differential 30 in accordance with one preferred embodiment of this invention. Differential 30 includes a differential case 32 defining a plurality of openings 34 therein. A ring gear 36 is attached in a conventional manner to case 32, and a conventional driving pinion gear (not shown) is in conventional meshing relation with ring gear 36.

Left and right axle means 40, 42 are disposed in end-to-end relationship to each other and at least partially positioned within case 32 for connecting with two wheels (not shown) of the vehicle.

Axle driving means 44, 44' are provided within case 32 and are connected in operative relationship with left and right axle means 40, 42, respectively, for selectively rotating the axle means. Gear assembly means 46, 46' are mounted on the exterior of case 32, project into the interior of case 32 through predetermined ones of openings 34, and are in meshing relation with axle driving means 44, 44', respectively, for controlling movement of axle driving means 44, 44'. A substantially oil-tight housing 47 encloses the previously recited differential elements.

In accordance with the invention, axle driving means 44 include left and right forward axle driving means 48, 48' respectively, within case 32 and connected in operative relationship with left and right axle means 40, 42, respectively, for selectively rotating axle means 40, 42 in a forward direction. Axle driving means 44' include left and right reverse axle driving means 50, 50' within case 32 and connected in operative relationship with left and right axle means 40, 42, respectively, for selectively rotating axle means 40, 42 in a reverse direction.

Figure 1:
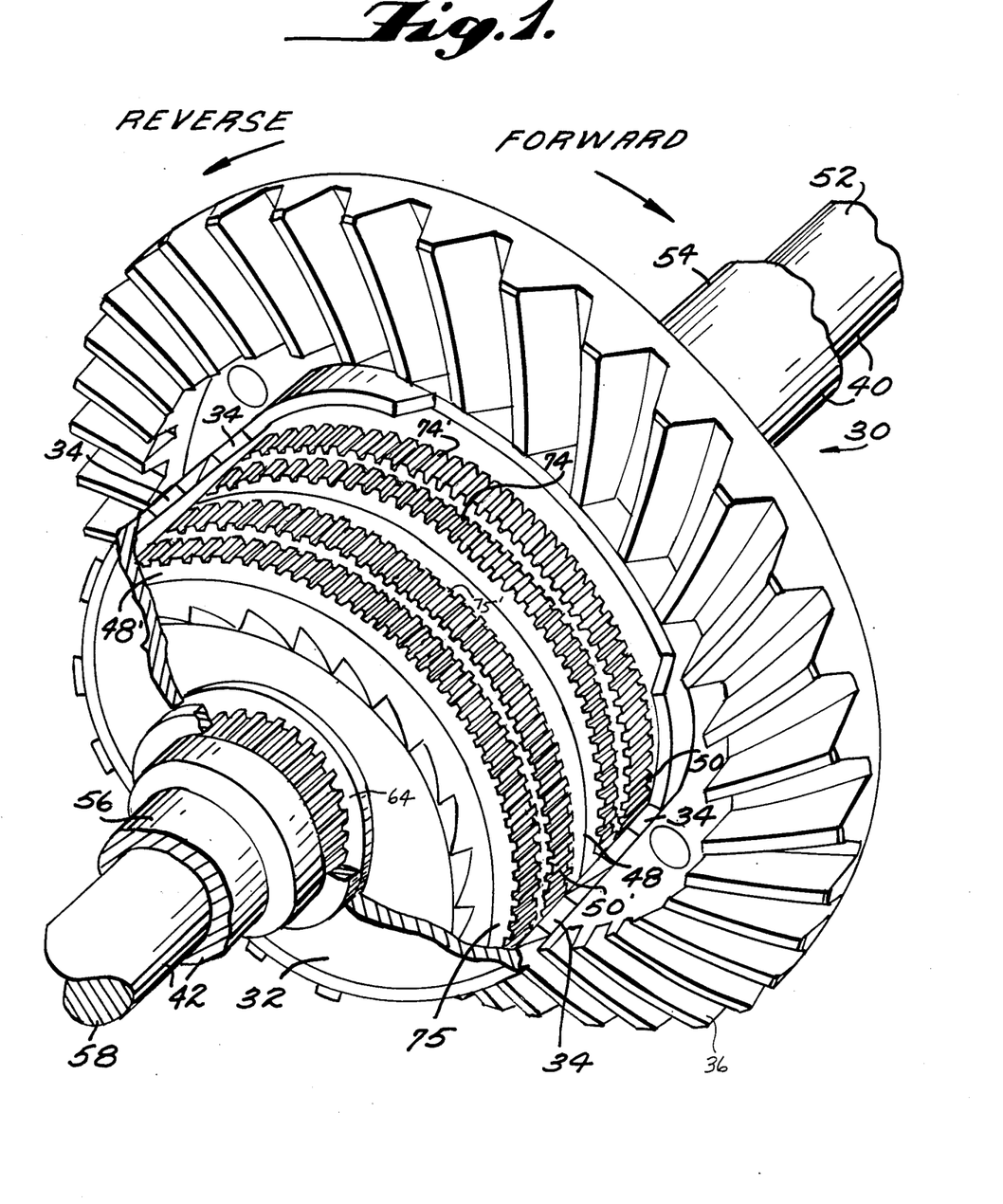
FIG. 1 is a fragmentary perspective view of one preferred embodiment of the invention.

As best shown in FIG. 1, left axle means 40 include a left forward axle 52 which is connected to left forward axle driving means 48. Left axle means 40 also include left reverse axle 54 connected to left reverse axle driving means 50.

Similarly, right axle means 42 include right forward axle 56 which is connected to right forward axle driving means 48. Right axle means 42 further include right reverse axle 58 connected to right reverse driving means 50'.

Left forward axle 52 is preferably a solid tubular member which fits within hollow tubular left reverse axle 54 in a conventional manner. Similarly, right reverse axle 58 is preferably a solid tubular member which fits within hollow tubular right forward axle 56 in a conventional manner.

In accordance with the invention, gear assembly means 46 include a pluraltiy of first gear assembly means 60 mounted on the exterior of case 32, projecting into the interior of the case through predetermined ones of openings 34, and in meshing relation with left and right forward axle driving means 48, 48' for controlling movement of left and right forward axle driving means 48, 48'.

Gear assembly means 46 further include a plurality of second gear assembly means 62 mounted on the exterior of case 32, projecting into the interior of the case through predetermined ones of openings 34, and in meshing relation with left and right reverse axle driving means 50, 50' for controlling movement of left and right reverse axle driving means 50, 50'.

In the preferred embodiment herein illustrated in FIGS. 1-7, each of left and right, forward and reverse axle driving means 48, 48', 50 and 50', respectively, includes a hub 64, 64', 65, 65', respectively mounted on one of left or right axle means 40, 42. For example, hub 64 of left forward axle driving means 48 is attached or splined to left forward axle 52 (see FIG. 2), and hub 65 of left reverse axle driving means 50 is similarly attached or splined to left reverse axle 54 (see FIG. 4). Similarly, hub 64' of right forward axle driving means 48' is attached or splined to right forward axle 56, and hub 65' of right reverse axle driving means 50' is attached or splined to right reverse axle 58 (see FIG. 4).

Figures 2, 3:
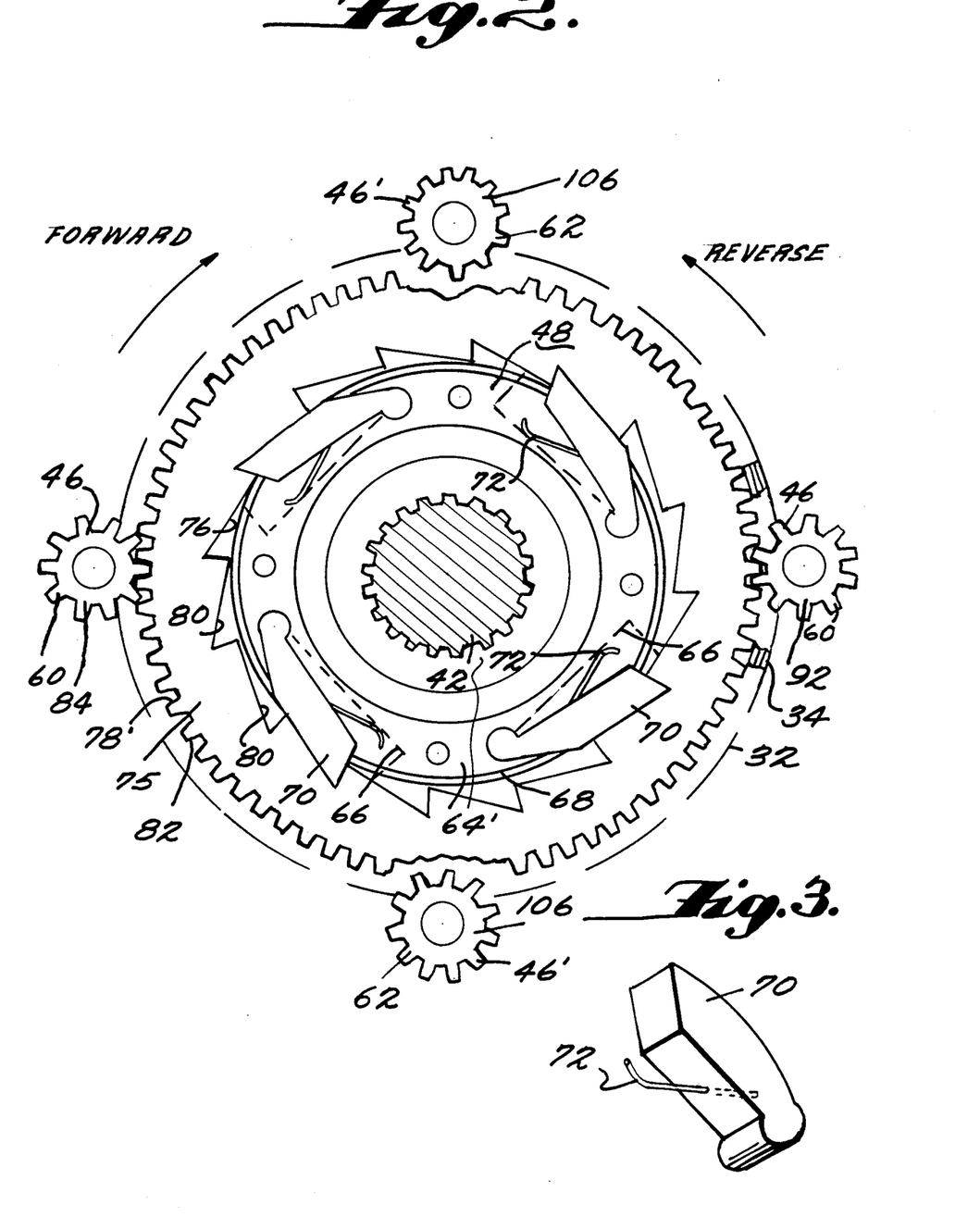
FIG. 2 is a fragmentary side diagrammatic elevation view of a portion of the embodiment shown in FIG. 1.
FIG. 3 is a perspective view of a pawl member which is a part of the embodiment of FIG. 1.

Each hub 64, 64', 65, 65' defines a plurality of slots 66 (see FIG. 2) around periphery 68 of the hub. Pawl members 70 are rotatably positioned, one each within each of slots 66, and spring means 72 are provided in operative relationship with each of pawl members 70 for selectively rotating pawl member 70 to a position partially out of its slot 66. The configuration and operation of spring means 72 are best illustrated in FIGS. 2 and 3.

Further in accordance with this embodiment of the invention, left and right forward axle driving means 48, 48' each includes a circumferential gear 74, 75, respectively, each of which defines inner and outer peripheral surfaces 76, 78. Each circumferential gear 74, 75 is held in position by the plurality of first gear assembly means 60 with inner peripheral surface 76 of each circumferential gear adjacent to periphery 68 of a respective one of hubs 64, 64'. This configuration for gear 74 is illustrated in FIG. 2.

Each of left and right reverse axle driving means 50, 50' includes a similar circumferential gear 74', 75', (see FIG. 4) each of which is held in position as described above with respect to gears 74, 75 but by the plurality of second gear assembly means 62. The inner peripheral surface (not shown) of each circumferential gear 74' 75' is of the same configuration as inner peripheral surface 76 of gears 74, 75, and the inner peripheral surface (not shown) of each gear 74', 75' is positioned adjacent to the periphery of a respective one of hubs 65, 65'.

Inner peripheral surface 76 of each of circumferential gears 74, 74' and the corresponding inner peripheral surface (not shown) of gears 75, 75' each is provided with notches 80, and notches 80 (see FIG. 2) are positioned to selectively receive one of pawl members 70.

Outer peripheral surface 78, 78' of each of forward circumferential gears 74, 75 is formed of gear teeth 82 which are in meshing relation with the plurality of first gear assembly means 60. Similarly, the outer peripheral surface of each of reverse circumferential gears 74', 75' is formed of gear teeth 82' (see FIG. 4) which are in meshing relation with the plurality of second gear assembly means 62.

In accordance with this embodiment of the invention, each of first gear assembly means 60 includes a first gear 84 (see FIG. 4) mounted on the exterior of case 32 and projecting through a predetermined one of openings 34 in meshing relation with a first one of forward circumferential gears 75. A second gear 86 is spaced a predetermined distance from first gear 84. A first gear shaft 88 rigidly connects together first and second gears 84, 86 and shaft 88 is rotatably mounted in bearings 90 on the exterior of case 32. Similarly, a third gear 92 is mounted on the exterior of case 32 and projects through a predetermined one of openings 34 in meshing relation with a second one of forward circumferential gears 75. A fourth gear 94 is spaced a predetermined distance from third gear 92 and is in meshing relation with second gear 86. A second gear shaft 96 rigidly connects together third and fourth gears 92, 94, and shaft 96 is rotatably mounted in bearings 98 on the exterior of case 32.

In accordance with the invention, each first gear assembly means 60 further includes a first control gear 100 rigidly mounted on first gear shaft 88 and adjacent to first gear 84. A second control gear 102 is rigidly mounted on second gear shaft 96 and adjacent to third gear 92 (see FIG. 4).

In the embodiment illustrated in FIGS. 1-7, first means 104 (FIG. 6) are mounted on the exterior of case 32 and in operative relationship with control gears 100, 102 for selectively interacting with the control gears for controlling their speed of rotation and the speed of rotation of first and third gears 84, 92.

As herein embodied, each of second gear assembly means 62 is similar in construction to first gear assembly means 60 but includes a fifth gear 106 (see FIG. 4) mounted on the exterior of case 32 and projecting through a predetermined one of openings 34 in meshing relationship with one of reverse circumferential gears 75' associated with right reverse axle driving means 50'. A sixth gear 108 is spaced a predetermined distance from gear 106. A third gear shaft 110 rigidly connects together gears 106, 108 and shaft 110 is rotatably mounted on the exterior of case 32 by means of bearings 112.

A seventh gear 114 (FIG. 4) is mounted on the exterior of case 32, projects through a predetermined one of case openings 34 and is in meshing relation with one of reverse circumferential gears 74', which is associated with left reverse axle driving means 50. An eighth gear 116 is spaced a predetermined distance from gear 114 and is in meshing relation with gear 108. A fourth gear shaft 118 rigidly connects together gears 114, 116 and is rotatably mounted on the exterior of case 32 by means of bearings 120.

Figure 4:
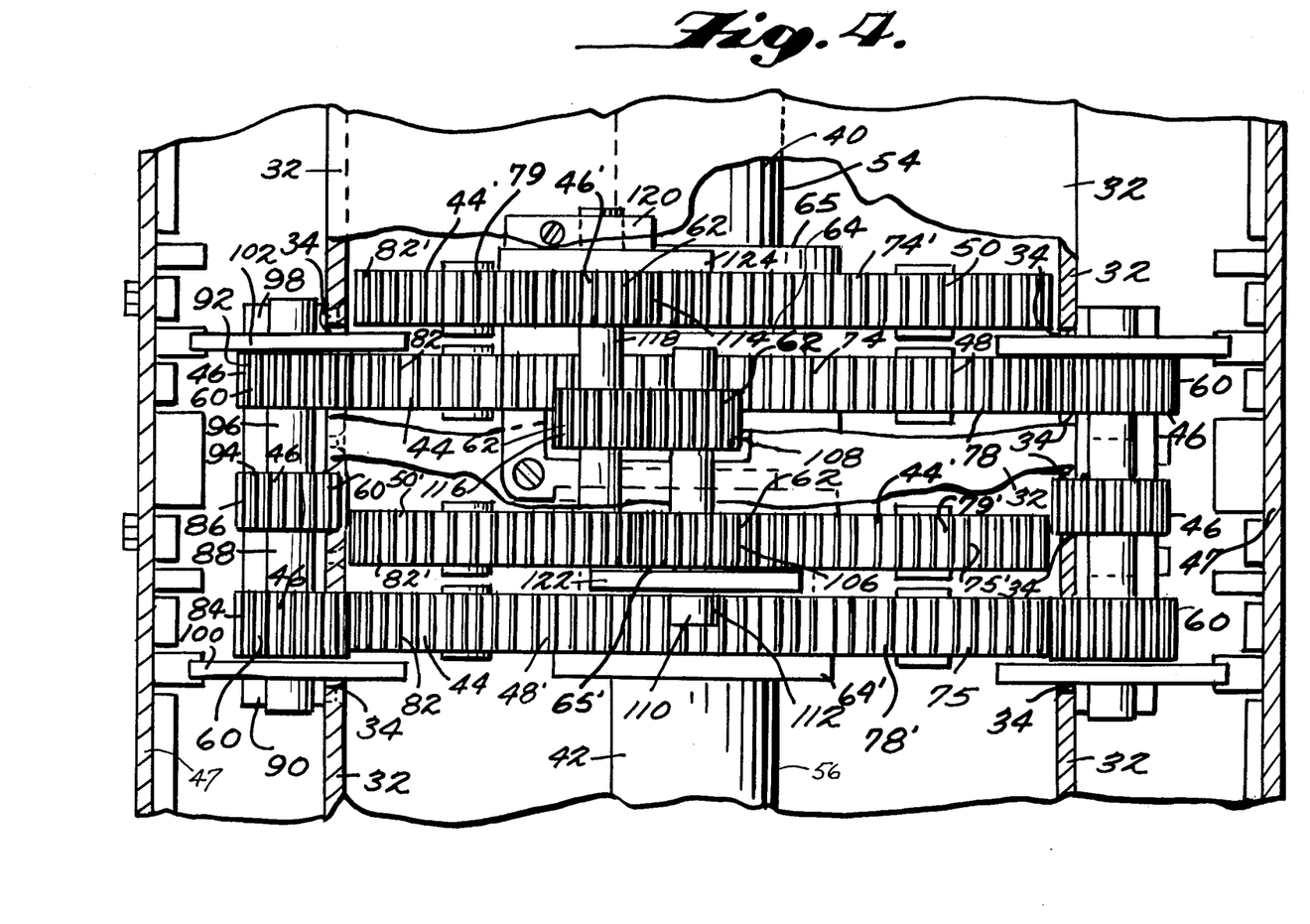
FIG. 4 is a fragmentary top plan view of the embodiment of FIG. 1.
Figure 5:
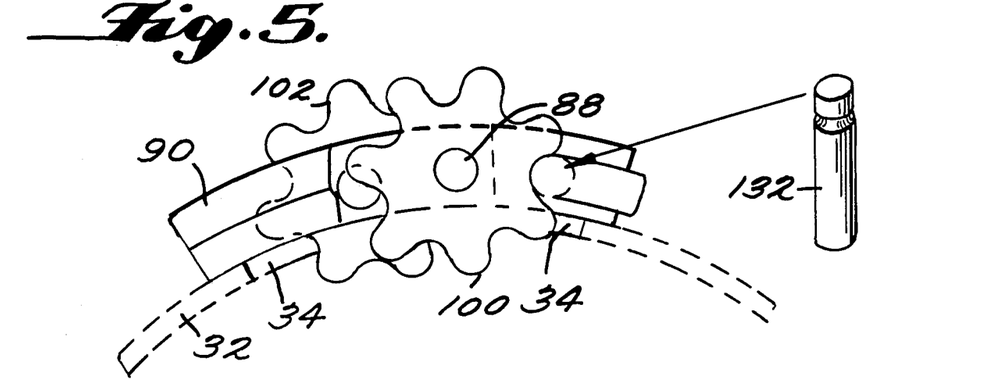
FIG. 5 is a fragmentary side elevation detail view of a portion of the embodiment of FIG. 1.

As in first gear assembly means 60, each second gear assembly means 62 further includes a third control gear 122 rigidly mounted on gear shaft 110 and adjacent to fifth gear 106. A fourth control gear 124 is rigidly mounted on gear shaft 118 and is positioned adjacent to gear 114.

As further embodied, second means (not shown) substantially identical in configuration to first means 104 (FIG. 6) are mounted on the exterior of case 32 and in operative relationship with control gears 122, 124 for selectively interacting with control gears 122, 124 for controlling their speed of rotation and the speed of rotation of gears 106, 114.

Each of first controlling means 104 (FIG. 6) includes a first arm member 128 rotatably mounted on the exterior of case 32 by means of a pivot member 136. Each arm member 128 is positioned adjacent to a respective one of first control gears 100 and to one of second control gears 102. A first control gear engaging member 130, such as a roller, is attached to each arm member 128 and is positioned in contacting relationship with a respective one of first control gears 100. A second control gear engaging member 132, such as a roller, is attached to each arm member 128 and is positioned in contacting relationship with a respective one of control gears 102.

Figures 6, 7:
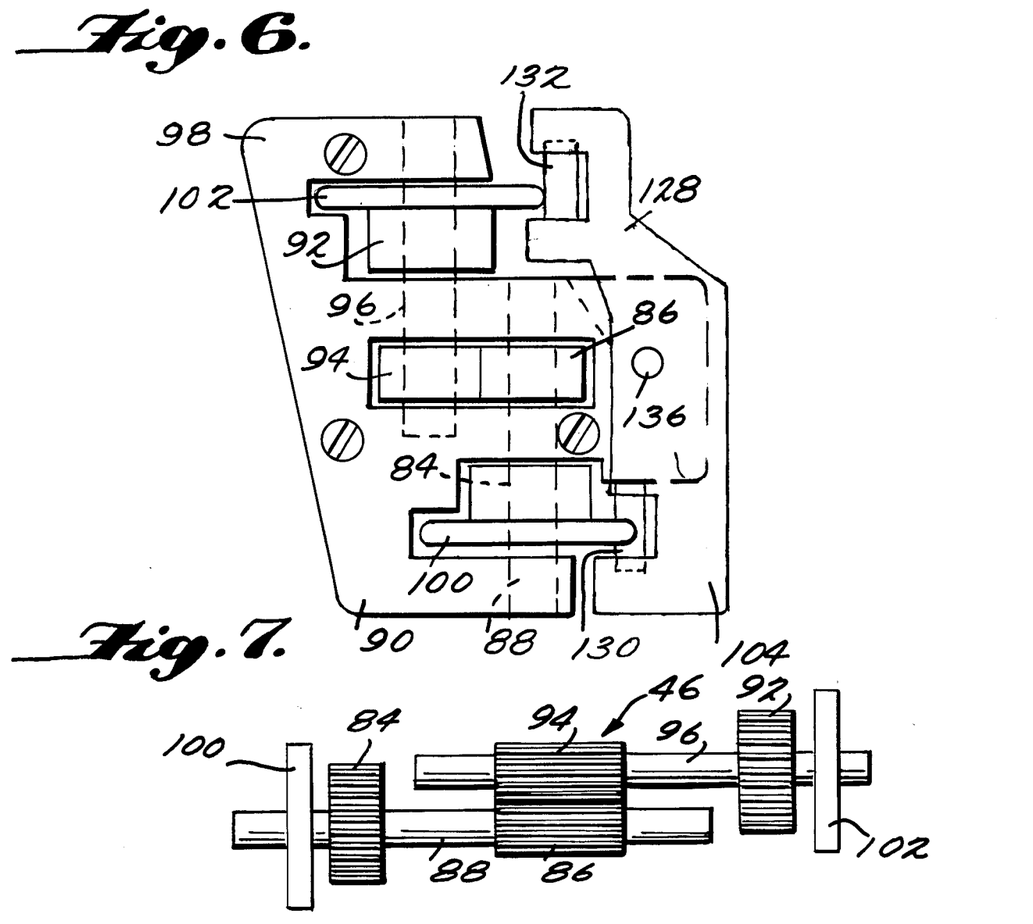
FIG. 6 is a fragmentary top plan detail view of a portion of the embodiment of FIG. 1.
FIG. 7 is a front elevation view of one gear assembly of the embodiment of FIG. 1 and as illustrated in FIG. 4.

Each of arm members 128 and respective ones of control gears 100, 102 are positioned such that rotation of control gears 100, 102 about their respective gear shafts causes engaging member 132 to contact a high point on control gear 102 when engaging member 130 contacts a low point on control gear 100, and vice versa. As a result, the speed of rotation of control gears 100, 102 and gears 84, 92 is slowed.

Similarly, each of the second controlling means (not shown) for controlling the speed of rotation of gears 106, 114 is rotatably mounted on the exterior of case 32 adjacent to one of control gears 122 and to one of control gears 124. As described above with respect to slowing of gears 84, 92 by first controlling means 104, the second controlling means (not shown) similarly interacts with control gears 122, 124 to slow them and to slow the speed of rotation of gears 106, 114.

In the embodiment illustrated in FIGS. 1-7, the ratio of the gear teeth on outer peripheral surfaces 78, 78', 79, 79' of circumferential gears 74, 75, 74' and 75' to the teeth on gears 92, 84, 114 and 106, respectively, is preferably ten to one.

An alternative preferred embodiment of this invention is illustrated in FIGS. 8-13 wherein axle driving means 44' include left and right driving gears 142, 144 connected, respectively, to left and right axle means 40, 42.

Gear assembly means 46' include left and right large power gears 146, 148 mounted on the exterior of case 32, projecting into the interior of the case through predetermined ones of openings 34, and in meshing relation with left and right driving gears 142, 144, respectively. Gear assembly means 46' include left and right small power gears 150, 152 spaced predetermined distances from left and right large power gears 146, 148, respectively, and a left power gear shaft 154 rigidly connects together left large gear 146 and left small gear 150. Power gear shaft 154 is rotatably mounted on the exterior of case 32 by means of bearings 156. A right power gear shaft 158 rigidly connects together right large power gear 148 and right small power gear 152, and power gear shaft 158 is rotatably mounted on the exterior of case 32 by bearings 160. Left and right supporting gears 162, 164 are rotatably mounted on the exterior of case 32 by means of bearings 166, 168, and gears 162, 164 are in meshing relation with each other.

Gear assembly means 46' further include a left ring control gear 170 having a scalloped side surface 172 and having an inner circumferential periphery surface 174 formed of gear teeth 176. Ring control gear 170 is supported in meshing relationship with left small power gear 150 and with left supporting gear 162. A right ring control gear 178 is also provided which has a scalloped side surface 180 and an inner circumferential periphery surface 182 formed of gear teeth 184. Ring control gear 178 is supported in meshing relationship with right small power gear 152 and with right supporting gear 164. Scalloped side surfaces 172, 180 of ring control gears 170, 178 are located in opposing relationship with each other. Means 186 are also mounted on the exterior of case 32 and in operative relationship with ring control gears 170, 178 for selectively interacting with the ring control gears for controlling their speed of rotation and the speed of rotation of left and right driving gears 142, 144.

As embodied in the invention as illustrated in FIGS. 8-13, speed controlling means 186 include a first bar member 188 pivotally mounted on the exterior of case 32 by pivot member 190 and adjacent to scalloped side surface 172 of left ring control gear 170. First and second contacting means or rollers 192, 194 are attached adjacent to first and second opposite ends 196, 198 of bar member 188, respectively, for simultaneously contacting scalloped side surface 170.

A second bar member 200 is pivotally mounted by means of pivot member 202 to the exterior of case 32 and is adjacent to scalloped side surface 180 of right ring control gear 178. Second bar member 200 is also mounted adjacent to first bar member 188. Third and fourth contacting means or rollers 204, 205 are attached adjacent to first and second opposite ends 208, 210 of second bar member 200, respectively, for simultaneously contacting scalloped side surface, 180. A linkage member 212 is pivotally attached between first ends 196, 208 of bar members 188, 200.

Figures 12, 13:
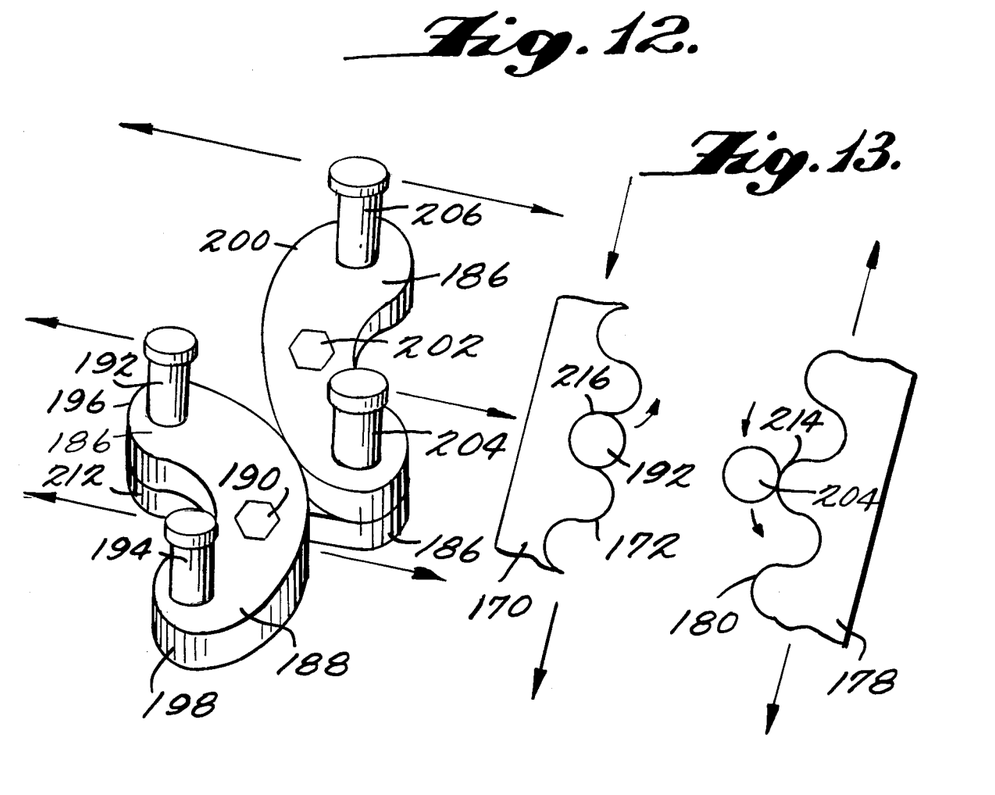
FIG. 12 is a fragmentary perspective view of bar members in the embodiment of FIG. 8.
FIG. 13 is a fragmentary plan view of a portion of the embodiment of FIG. 8 showing rollers in contact with control gears.

Bar members 188, 200 are substantially arcuate in shape, and contacting means 192, 194, 204, 206 each include a roller rotatably mounted on its respective bar member.

In accordance with this embodiment of the invention, contacting means 192, 204 are spaced a predetermined distance apart from each other, the distance being substantially equal to the distance between a high point 214 on scalloped side surface 180 of ring control gear 178 and an opposed low point 216 on scalloped side surface 172 of left ring control gear 170.

First contacting means or roller 192 contacts a low point 216 on scalloped side surface 172 of left ring control gear 170 when second contacting means or roller 194 contacts a high point 218 on scalloped side surface 172. Similarly, third contacting means or roller 204 simultaneously contacts a high point 214 on scalloped side surface 180 of right ring control gear 178 when fourth contacting means 206 contacts a low point 220 on scalloped side surface 180.

A plurality of similar speed controlling means 186 may be located at predetermined locations around the exterior of differential case 32.

Figure 8:
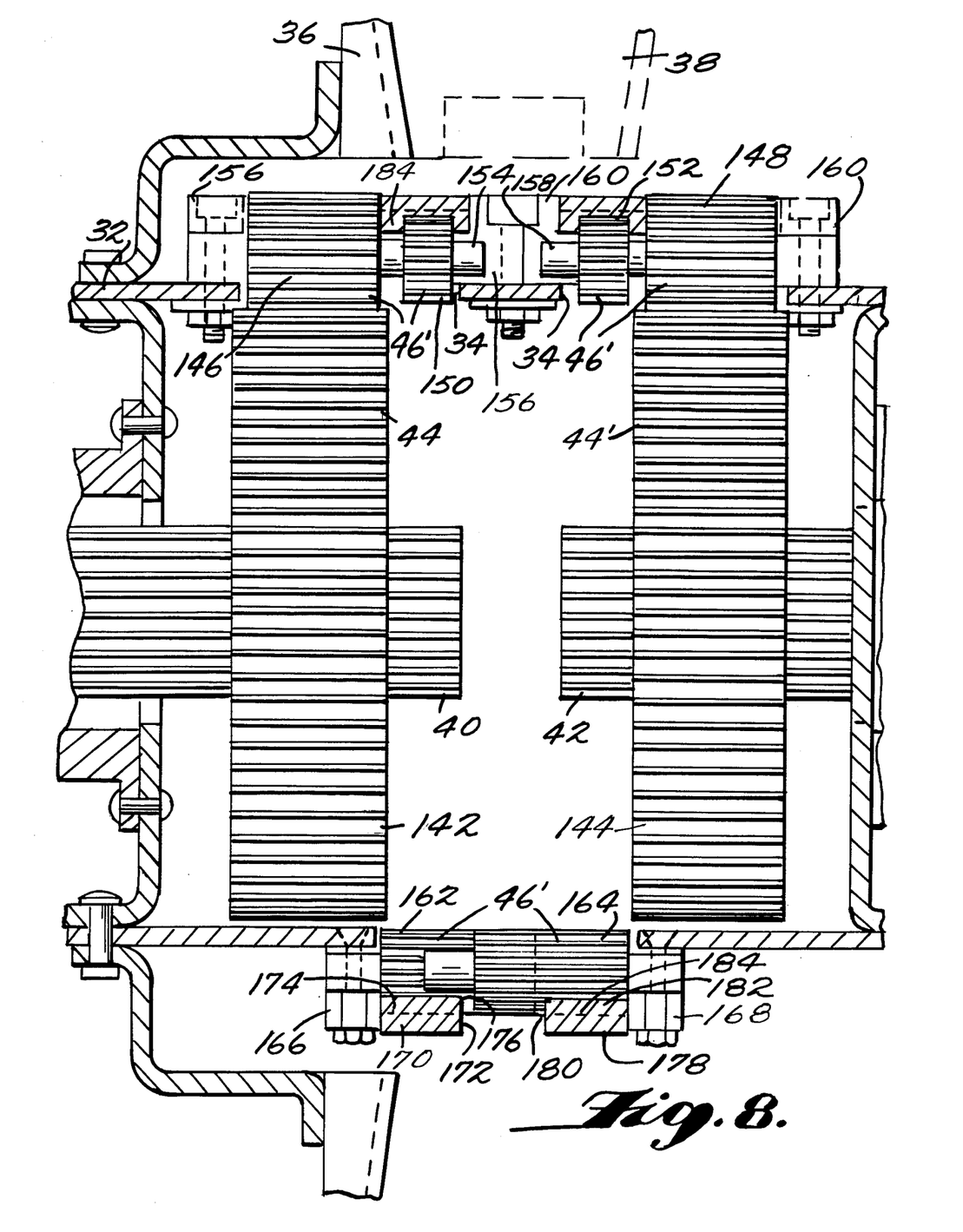
FIG. 8 is a fragmentary top plan view, partly in section, of a second preferred embodiment of the invention.
Figure 9:
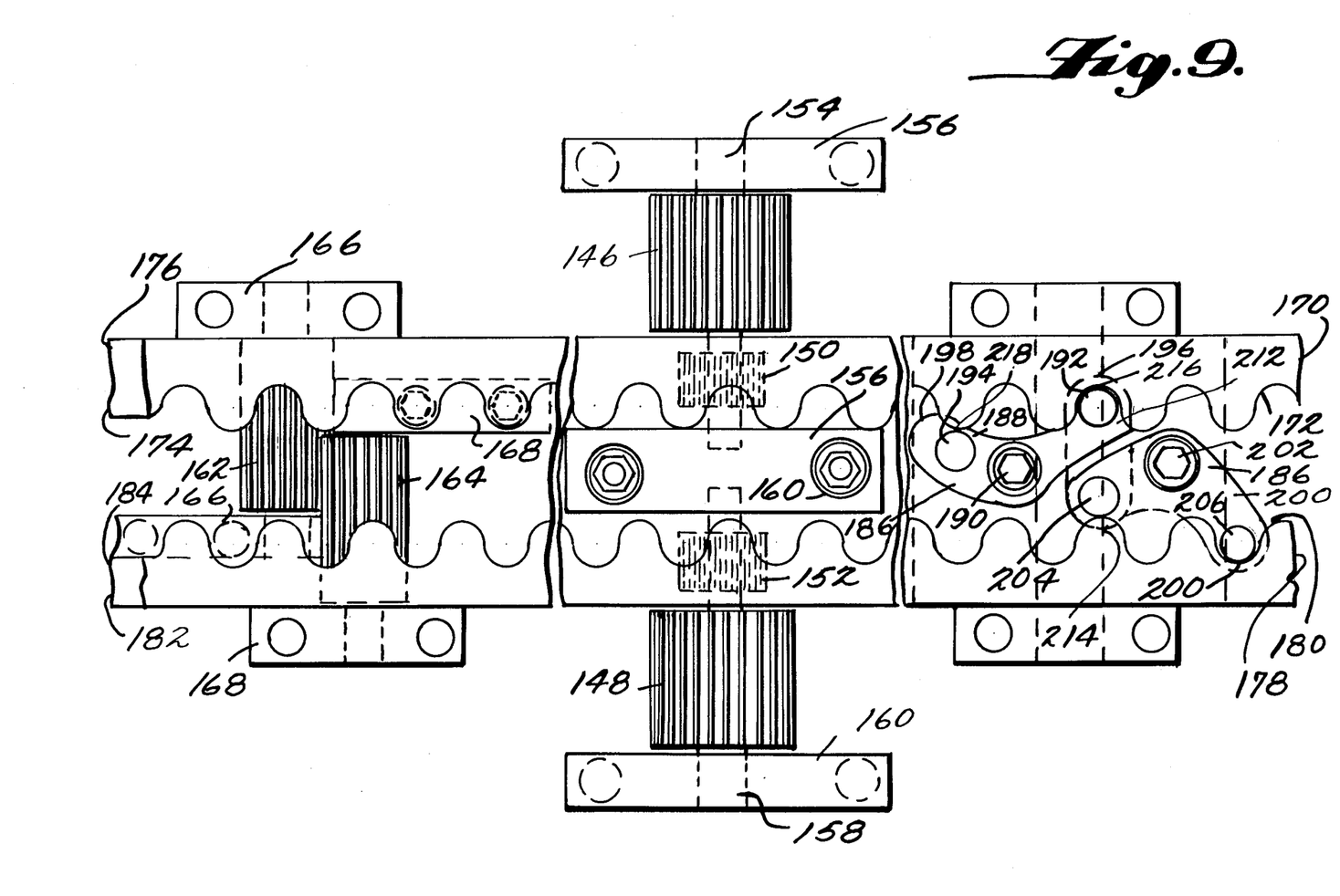
FIG. 9 is a fragmentary top plan view of a different portion of the embodiment of FIG. 8.
Figure 10:
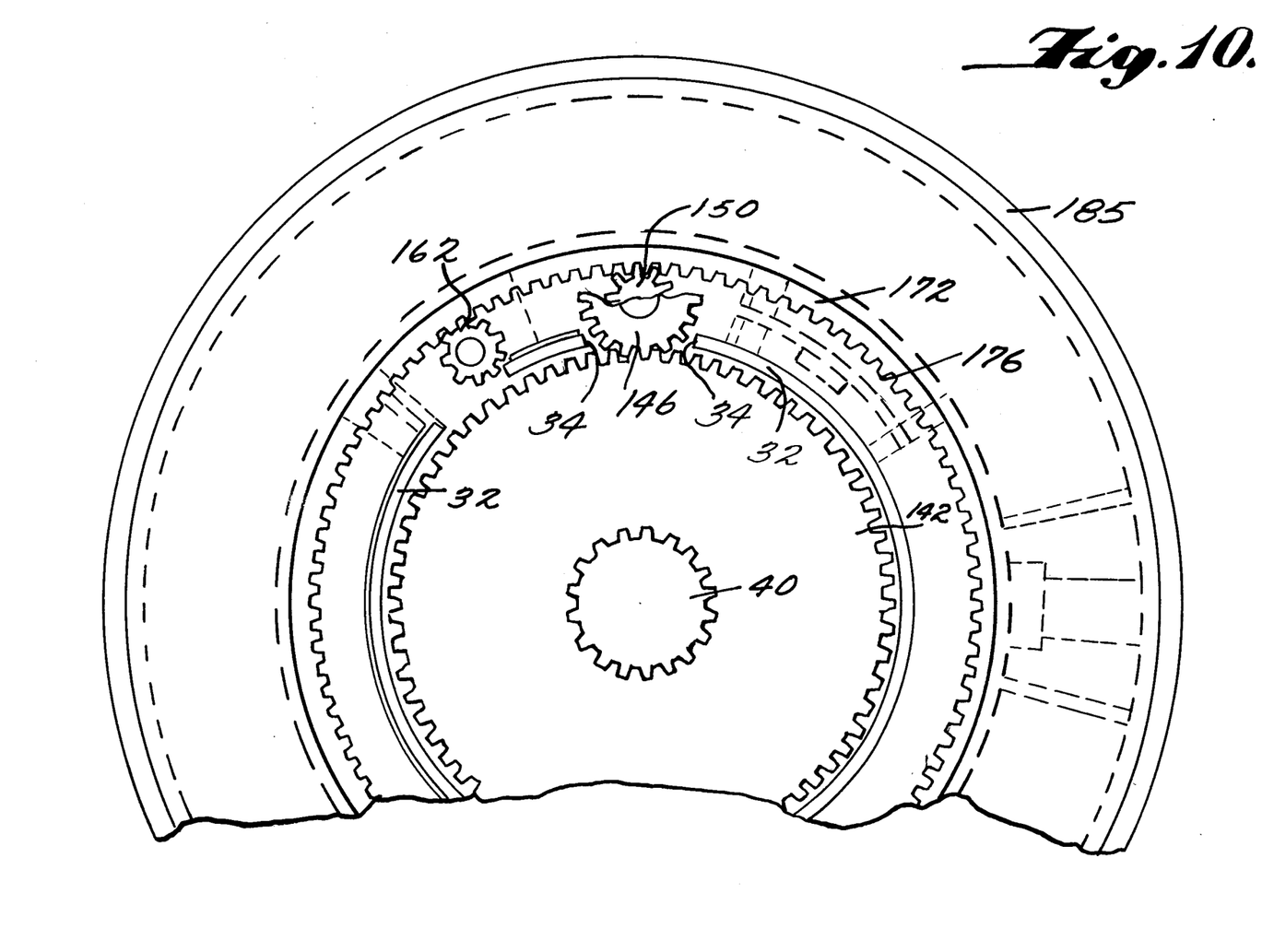
FIG. 10 is a fragmentary side elevation view, partly in section, of the embodiment of FIG. 8.
Figure 11:
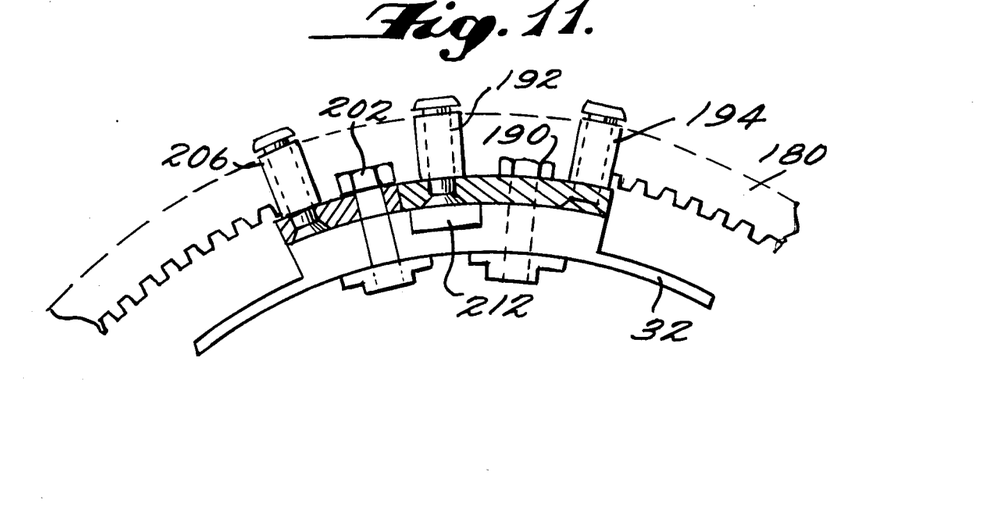
FIG. 11 is a fragmentary side elevation view, partly in section, of a portion of the embodiment of FIG. 8.

The ratio of teeth on left small power gear 150 to gear teeth 176 on inner surface 174 of left ring control gear 170 is preferably one to ten, and the ratio of teeth on right small power gear 152 to teeth 184 on inner surface 182 of right ring control gear 178 is also preferably one to ten. The differential is positioned within a conventional oil-tight housing 185.

In operation of the preferred embodiment of the invention illustrated in FIGS. 1-7, power from the vehicle's engine (not shown) is transferred through a conventional pinion gear (not shown) to ring gear 36. Ring gear 36 is attached to differential case 32, and case 32 rotates with ring gear 36.

When differential case 32 is rotating in a forward direction, as the vehicle is traveling in a forward direction and in a straight line, gears 84, 92 in each of first gear assembly means 60 engage left and right forward circumferential gears 74, 75 respectively. Circumferential gears 74, 75 are then caused to rotate in a forward direction. Because gears 84, 92 are so much smaller than circumferential gears 74, 75, and because gears 84, 92 within each gear assembly means 60 can only rotate in directions opposite to each other, movement of gear assembly means 60 with case 32 causes gears 84, 92 to rotate circumferential gears 74, 75 in a forward direction. If the vehicle is going in a straight direction, gears 84, 92 do not rotate in relation to differential case 32.

As circumferential gears 74, 75 rotate in a forward direction, notches 80 within each gear 74, 75 (FIG. 2) engage pawl members 70. This, in turn, causes rotation of hubs 64, 64' associated with each gear 74, 75 in a forward direction, and axles 40, 42 are caused to rotate in a forward direction.

Spring means 72 attached to each pawl member 70 cause each pawl member to rotate to a position partially outside of its respective slot 66 (FIG. 2) so that each pawl member 70 engages a notch 80 on left and right forward circumferential gears 74, 75 when differential case 32 is rotating in a forward direction.

Rotation of differential case 32 in a forward direction also causes rotation of each of gear assembly means 62 (FIG. 2). This causes gears 106, 114 to rotate right and left reverse circumferential gears 75', 74', respectively, in a forward direction. However, because each of circumferential gears 74', 75' is mounted in a "flipped" or 180° position with respect to the position of circumferential gears 74, 75 (FIG. 2), pawl members 70 associated with circumferential gears 74', 75' will not engage notches 80 of circumferential gears 74', 75'. The rotation of gears 74', 75' over their respective pawl members 70, together with the flow of oil over pawl members 70, will force the pawl members into their respective slots 66. The force of springs 72 will be overcome and hubs 65, 65' associated with each circumferential gear 74', 75', respectively, will not be rotated.

Thus, when differential case 32 is rotating in a forward direction, only forward circumferential gears 74, 75 are engaged by their respective pawl members 70, and only forward axles 52, 56 are rotated in a forward direction. No power is imparted to reverse axles 54, 58.

If differential case 32 rotates in a reverse direction, only reverse circumferential gears 74', 75' are engaged by their respective pawl members 70 to impart driving force to reverse axles 54, 58.

When the vehicle makes a left turn, for example, the inside or left wheel must make a smaller arc than the outside or right wheel. The right wheel must travel farther than the left wheel, and the differential must differentiate or compensate between these two arcs. Differentiation is accomplished by gear assemblies 46 when the vehicle is moving forward and by gear assemblies 46' when the vehicle is moving in a reverse direction.

As the vehicle moves forward and turns to the left, gear assemblies 46, which are geared through gears 84, 92 to forward circumferential gears 75, 74, respectively, allow right forward circumferential gear 75 to rotate at a greater speed than left forward circumferential gear 74. The rotational speed of gear 75 is increased by the same amount as the rotational speed of gear 74 is decreased. This is accomplished because meshing gears 86, 94 within each gear assembly 46 (FIGS. 4, 6 and 7) can only rotate, if they rotate at all, in directions opposite to one another.

Control gears 100, 102 in each gear assembly 46 (FIGS. 4 and 6) are positioned adjacent to gear engaging members 130, 132 of speed controlling means 104 (FIG. 6). Control gears 100, 102 are scalloped gears (FIG. 5), and rollers 130, 132 of each rocker arm 129 are positioned adjacent to scalloped gears 100, 102 so that the first roller 130 is contacting a low point of scalloped gear 100 while second roller 132 contacts a high point of scalloped gear 102 (FIG. 6).

As differential 30 is differentiating, scalloped gears 100, 102 within each gear assembly 46 rotate in directions opposite to each other. This, in turn, causes each rocker arm 128 to oscillate about its pivot member 136 (FIG. 6). The oscillating or rocking motion of rocker arm 128 slows the rotational movements of its respective scalloped gears 100, 102 and simultaneously slows the differential action. This permits sufficient differentiation to allow the vehicle to negotiate sharp turns but will not allow scalloped gears 100, 102 and gears 84, 92 to rotate at high speeds to permit one wheel of the vehicle to spin at a high speed while the other wheel sits still. The end result is also to automatically transfer torque to the wheel of the vehicle that is not slipping. This transfer of torque is enhanced by the ratio of the gear teeth on the outer peripheral surfaces of circumferential gears 74, 75 to the teeth on gears 92, 84, which is preferably ten to one.

When the vehicle is moving in a reverse direction and differentiation occurs the differentiation process functions as previously described with respect to forward differentiation. However, when the vehicle is moving in a reverse direction, reverse circumferential gears 74', 75' are engaged by their respective pawl members 70 to cause rotation of reverse axles 54, 58. Also, differentiation in the reverse direction is accomplished by gear assemblies 46' (FIG. 4) which are identical in configuration to gear assemblies 46 (FIG. 7).

In operation of another preferred invention embodiment, illustrated in FIGS. 8–13, differential pinion gear 38 meshes with ring gear 36. Rotation of pinion gear 38 causes ring gear 36 to rotate, and this causes differential case 32 to rotate with ring gear 36. Ring gear 36 is attached to case 32 in a conventional manner.

Rotation of case 32 causes large power gears 146, 148 and small power gears 150, 152 to move with case 32. If the vehicle is going straight ahead and no differentiation is occurring, power gears 146, 148, 150, and 152 will move in fixed relationship with respect to case 32, and shafts 154, 158 will not rotate.

As a result of the movement of power gears 146, 148 with case 32, left and right driving gears 142, 144 are driven by power gears 146, 148, respectively. Rotation of driving gears 142, 144, in turn, causes rotation of axle means 40, 42, respectively, and the driving wheels (not shown) of the vehicle are rotated.

If the vehicle is making a left-hand turn, for example, differentiation must occur. Left axle 40 must then rotate more slowly than right axle 42. During differentiation, power gears 146, 148 and shafts 154, 158 will rotate relative to case 32 and in directions opposite to one another. Power gears 146, 148 and shafts 154, 158 can only rotate with respect to case 32 in opposite directions to one another because of the meshing action of supporting gears 162, 164.

The rotation of power gears 146, 148 relative to case 32 causes simultaneous rotation of associated small power gears 150, 152. Gears 150, 152 then rotate in directions opposite to one another. This, in turn, causes rotation of ring control gears 170, 178 in directions opposite to each other. The rotation of ring control gears 170, 178 in directions opposite to each other causes rollers 192, 204 on bar members 188, 200 to oscillate back and forth as the rollers ride over the high points of scalloped side surfaces 172, 180 of ring control gears 170, 178.

Simultaneously, rollers 194, 204 of bar members 188, 200 ride over the high points of scalloped side surfaces 172, 180. For example, roller 192 contacts low point 216 on scalloped side surface 172 as roller 194 contacts high point 218 of surface 172. Simultaneously, roller 204 of bar member 200 contacts high point 214 on scalloped side surface 180 when roller 206 contacts low point 220 on surface 180.

An oscillating movement of bar members 188, 200 about pivot members 190, 202, respectively, and the engagement of rollers 192, 194, 204 and 206 with scalloped side surfaces 172, 180 slows the rotation of ring control gears 170, 178. This, in turn, slows the rotation of power gears 146, 148 and allows the differential to differentiate enough to allow the vehicle to negotiate sharp turns without allowing ring control gears 170, 178 to rotate around case 32 at a high rate of speed.

As a result, one wheel of the vehicle cannot spin at a high speed while the other remains stationary. Because power gears 146, 148 are much smaller than their associated driving gears 142, 144, the ratio is preferably one to ten, a significant amount of torque is applied to the stationary driving gear and to the stationary vehicle wheel. Therefore, if the left wheel of the vehicle, for example, is on pavement and the right hand wheel of the vehicle is on ice, the right hand wheel would spin, but at a relatively slower speed, and significant torque would be applied to the left hand wheel.

If the vehicle is traveling in a reverse direction and in a straight line, power gears 146, 148 move with case 32 to cause driving gears 142, 144 to rotate the vehicle wheels in a reverse direction. When the vehicle is turning and is moving in a reverse direction, differentiation occurs as previously described.

The invention in its broader aspects is not limited to the specific details shown and described, and departures may be made from such details without departing from the principles of the invention and without sacrificing its chief advantages.

What is claimed is:

1. A differential for a vehicle, said differential comprising:
   a differential case defining a plurality of openings therein;
   a ring gear attached to said case;
   a driving pinion gear in meshing relation with said ring gear;
   left and right axle means disposed in end-to-end relationship to each other and at least partially positioned within said case for connecting with two wheels of the vehicle;
   axle driving means within said case and in operative relationship with said left and right axle means for selectively rotating said axle means;
   gear assembly means mounted on the exterior of said case, projecting into the interior of said case through predetermined ones of said openings, and in meshing relation with said axle driving means for controlling movement of said axle driving means;
   a substantially oil-tight housing enclosing the previously recited elements, and said axle driving means including:
   left and right forward axle driving means within said case and in operative relationship with said left and right axle means, respectively, for selectively rotating said axle means only in a forward direction; and
   left and right reverse axle driving means within said case and in operative relationship with said left and right axle means, respectively, for selectively rotating said axle means only in a reverse direction.

2. A differential as in claim 1 wherein said gear assembly means include:
   first gear assembly means mounted on the exterior of said case, projecting into the interior of said case through predetermined ones of said openings, and in meshing relation with said left and right forward axle driving means for controlling movement of only said left and right forward axle driving means; and
   second gear assembly means mounted on the exterior of said case, projecting into the interior of said case through predetermined ones of said openings, and in meshing relation with said left and right reverse axle driving means for controlling movement of only said left and right reverse axle driving means.

3. A differential as in claim 2 wherein said left and right, forward and reverse axle driving means each include:
   hubs mounted, respectively, on said left and right axle means;
   each said hub defining a plurality of slots around the periphery thereof;
   pawl members rotatably positioned one each within each of said slots; and
   spring means in operative relationship with each of said pawl members for selectively rotating said pawl member to a position partially out of its slot.

4. A differential as in claim 3 wherein said left and right forward axle driving means include:
   first and second circumferential gears each defining inner and outer peripheral surfaces and each held in position by said first gear assembly means with said inner peripheral surface adjacent to the periphery of a respective one of said hubs.

5. A differential as in claim 4 wherein said right and left reverse axle driving means include:
   third and fourth circumferential gears each defining inner and outer peripheral surfaces and each held in position by said second gear assembly means with said inner peripheral surface adjacent to the periphery of a respective one of said hubs.

6. A differential as in claim 5 wherein said inner periphera surface of each of said circumferential gears is notched and positioned to selectively receive one of said pawl members.

7. A differential as in claim 6 wherein said outer peripheral surface of each of said first and second circumferential gears is formed of gear teeth which are in meshing relation with said first gear assembly means.

8. A differential as in claim 7 wherein said outer peripheral surface of each of said third and fourth circumferential gears is formed of gear teeth which are in meshing relation with said second gear assembly means.

9. A differential as in claim 8 wherein each of said first gear assembly means includes:

a first gear mounted on the exterior of said case and projecting through a predetermined one of said openings in meshing relation with said second circumferential gear;

a second gear spaced a predetermined distance from said first gear;

a first gear shaft rigidly connecting together said first and second gears and rotatably mounted on the exterior of said case;

a third gear mounted on the exterior of said case and projecting through a predetermined one of said openings in meshing relation with said first circumferential gear;

a fourth gear spaced a predetermined distance from said third gear and in meshing relation with said second gear; and a second gear shaft rigidly connecting together said third and fourth gears and rotatably mounted on the exterior of said case.

10. A differential as in claim 9 wherein said first gear assembly means each further includes:

a first control gear rigidly mounted on said first gear shaft and adjacent to said first gear;

a second control gear rigidly mounted on said second gear shaft and adjacent to said third gear; and first means mounted on the exterior of said case in operative relationship with said first and second control gears for selectively interacting with said control gears for controlling their speed of rotation and the speed of rotation of said first and third gears.

11. A differential as in claim 10 wherein each of said second gear assembly means includes:

a fifth gear mounted on the exterior of said case and projecting through a predetermined one of said openings in meshing relation with said third circumferential gear;

a sixth gear spaced a predetermined distance from said fifth gear;

a third gear shaft rigidly connecting together said fifth and sixth gears and rotatably mounted on the exterior of said case;

a seventh gear mounted on the exterior of said case and projecting through a predetermined one of said openings in meshing relation with said fourth circumferential gear;

an eighth gear spaced a predetermined distance from said seventh gear and in meshing relation with said sixth gear; and a fourth gear shaft rigidly connecting together said seventh and eighth gears and rotatably mounted on the exterior of said case.

12. A differential as in claim 11 wherein said second gear assembly means each further includes:

a third control gear rigidly mounted on said third gear shaft and adjacent to said fifth gear;

a fourth control gear rigidly mounted on said fourth gear shaft and adjacent to said seventh gear; and second means mounted on the exterior of said case in operative relationship with said third and fourth control gears fo selectively interacting with said control gears for controlling their speed of rotation and the speed of rotation of said fifth and seventh gears.

13. A differential as in claim 12 wherein each of said first controlling means includes:

a first arm member rotatably mounted on the exterior of said case adjacent to one of said first control gears and to one of said second control gears;

a first control gear engaging member attached to said first arm member and positioned in contacting relationship with said first control gear;

a second control gear engaging member attached to said first arm member and positioned in contacting relationship with said second control gear;

said first arm member and said first and second control gears positioned such that rotation of said first and second control gears about their respective gear shafts causes said first control gear engaging member to contact a high point on said first control gear when said second control gear engaging member contacts a low point on said second control gear and vice versa, whereby the speed of rotation of said first and second control gears and said first and third gears is slowed.

14. A differential as in claim 13 wherein each of said second controlling means includes:

a second arm member rotatably mounted on the exterior of said case adjacent to one of said third control gears and to one of said fourth control gears;

a third control gear engaging member attached to said second arm member and positioned in contacting relationship with said third control gear;

a fourth control gear engaging member attached to said second arm member and positioned in contacting relationship with said fourth control gear;

said second arm member and said third and fourth control members positioned such that rotation of said third and fourth control gears about their respective gear shafts causes said third control gear engaging member to contact a high point on said third control gear when said fourth control gear engaging member contacts a low point on said fourth control gear and vice versa, whereby the speed of rotation of said third and fourth control gears and said fifth and seventh gears is slowed.

15. A differential as in claim 14 wherein the ratio of said gear teeth on said outer peripheral surface of said first and second circumferential gears to teeth on said third and first gears, respectively, is 10 to 1.

16. A differential as in claim 15 wherein the ratio of said gear teeth on said outer peripheral surface of said third and fourth circumferential gears to teeth on said fifth and seventh gears, respectively, is 10 to 1.

* * * * *